(12) United States Patent
Akenine-Möller et al.

(10) Patent No.: US 8,437,563 B2
(45) Date of Patent: May 7, 2013

(54) VECTOR-BASED IMAGE PROCESSING

(75) Inventors: Tomas Akenine-Möller, Lund (SE); Jacob Munkberg, Malmö (SE); Jacob Ström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 649 days.

(21) Appl. No.: 12/522,743

(22) PCT Filed: Mar. 19, 2008

(86) PCT No.: PCT/SE2008/050309
§ 371 (c)(1),
(2), (4) Date: Jul. 10, 2009

(87) PCT Pub. No.: WO2008/123823
PCT Pub. Date: Oct. 16, 2008

(65) Prior Publication Data
US 2010/0046847 A1    Feb. 25, 2010

Related U.S. Application Data

(60) Provisional application No. 60/907,492, filed on Apr. 4, 2007.

(51) Int. Cl.
G06K 9/00    (2006.01)
G06K 9/36    (2006.01)
G06K 9/46    (2006.01)

(52) U.S. Cl.
USPC .............. 382/243; 382/233; 382/251

(58) Field of Classification Search .......... 382/233, 382/243, 251, 253, 166; 345/501, 582; 375/240–241, 260
See application file for complete search history.

(56) References Cited

U.S. PATENT DOCUMENTS 5,361,323 A * 11/1994 Murata et al. ............ 704/201
5,598,484 A *  1/1997 Suzuki et al. ............ 382/239
5,859,932 A *  1/1999 Etoh ........................ 382/253
(Continued)

FOREIGN PATENT DOCUMENTS

| EP | 1 376 472 | 1/2004 |
| WO | 2007/084062 | 7/2007 |
| WO | 2007/123452 | 11/2007 |

OTHER PUBLICATIONS

Chou, P.H.; Meng, T.H.;, "Vertex data compression through vector quantization," Visualization and Computer Graphics, IEEE Transactions on, vol. 8, No. 4, pp. 373-382, Oct./Dec. 2002.*

(Continued)

*Primary Examiner* — Andrae S Allison
(74) *Attorney, Agent, or Firm* — Nixon & Vanderhye, P.C.

(57) ABSTRACT

A block (300) of image elements (310) is compressed by determining multiple base vectors (510, 520, 530, 540) based on the feature vectors (312) associated with the image elements. Additional vectors (560, 570) are calculated based on defined pairs of neighboring base vectors (510, 520, 530, 540). A vector among the base vectors (510, 520, 530, 540) and the additional vectors (560, 570) is selected as representation of the feature vector (312) of an image element (310). An identifier (550) associated with selected vector is assigned to the image element (310) and included in the compressed block (500) which also comprises representations of the determined base vectors (510, 520, 530, 540).

18 Claims, 8 Drawing Sheets

U.S. PATENT DOCUMENTS

| | | | |
|---|---|---|---|
| 5,956,431 A | | 9/1999 | Iourcha et al. |
| 6,141,447 A * | | 10/2000 | Linzer et al. ............. 382/236 |
| 6,167,156 A * | | 12/2000 | Antoniades et al. ......... 382/232 |
| 6,687,411 B1 * | | 2/2004 | Miura et al. ............... 382/250 |
| 7,627,198 B2 * | | 12/2009 | Kondo et al. .............. 382/300 |
| 7,813,574 B2 * | | 10/2010 | Bossen ................... 382/250 |
| 2005/0195905 A1 * | | 9/2005 | Kowalski .................. 375/260 |
| 2009/0148059 A1 * | | 6/2009 | Matsuda ................... 382/251 |
| 2010/0129000 A1 * | | 5/2010 | Strom ..................... 382/253 |

OTHER PUBLICATIONS

Isenburg, M.; Alliez, P.;, "Compressing polygon mesh geometry with parallelogram prediction," Visualization, 2002. VIS 2002. IEEE , vol., No., pp. 141-146, 1-1 Nov. 2002.*

Jie Xu, Hao Jiang and Zhen Li, 2011. 3D Mesh Compression by Generalized Parallelogram Predictive Vector Quantization. Information Technology Journal, 10: 877-882.*

Yamasaki et al., "Fast and Efficient Normal MAP Compression Based on Vector Quantization", Acoustics, Speech and signal Processing, 2006, Piscataway, NJ, USA, IEEE, ISBN 978-1-4244-0469-8.

International Search Report for PCT/SE2008/050309, mailed Jul. 21, 2008.

Written Opinion of the International Searching Authority for PCT/SE2008/050309, mailed Jul. 21, 2008.

ATI™ Radeonx™ X800/3Dc™ White Paper, http://www.ati.com/products/radeonx800/3DcWhitePaper.pdf, May 2004.

* cited by examiner

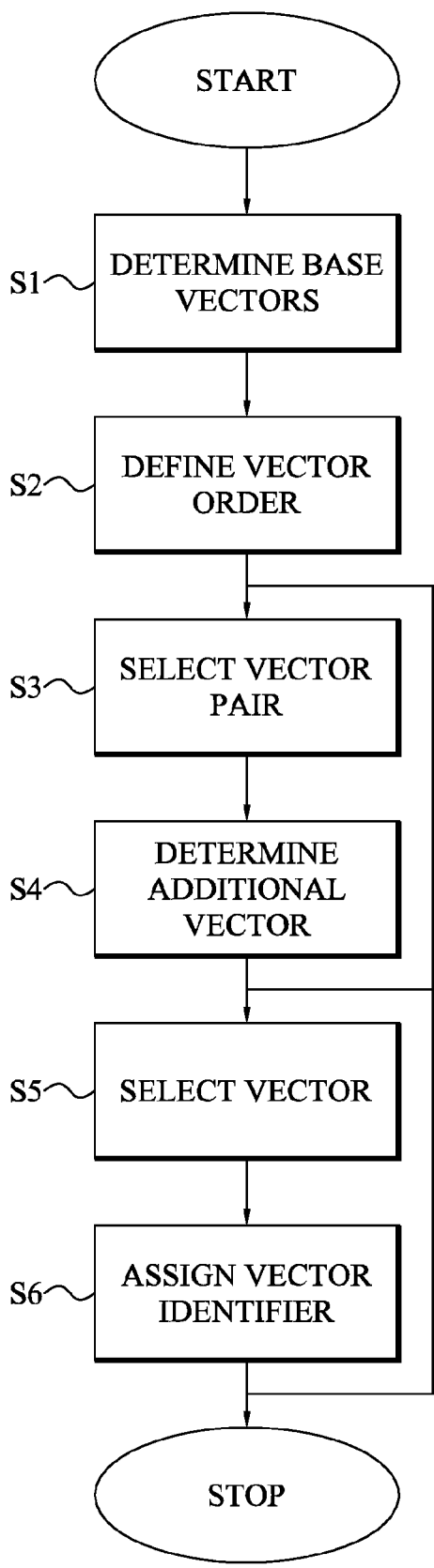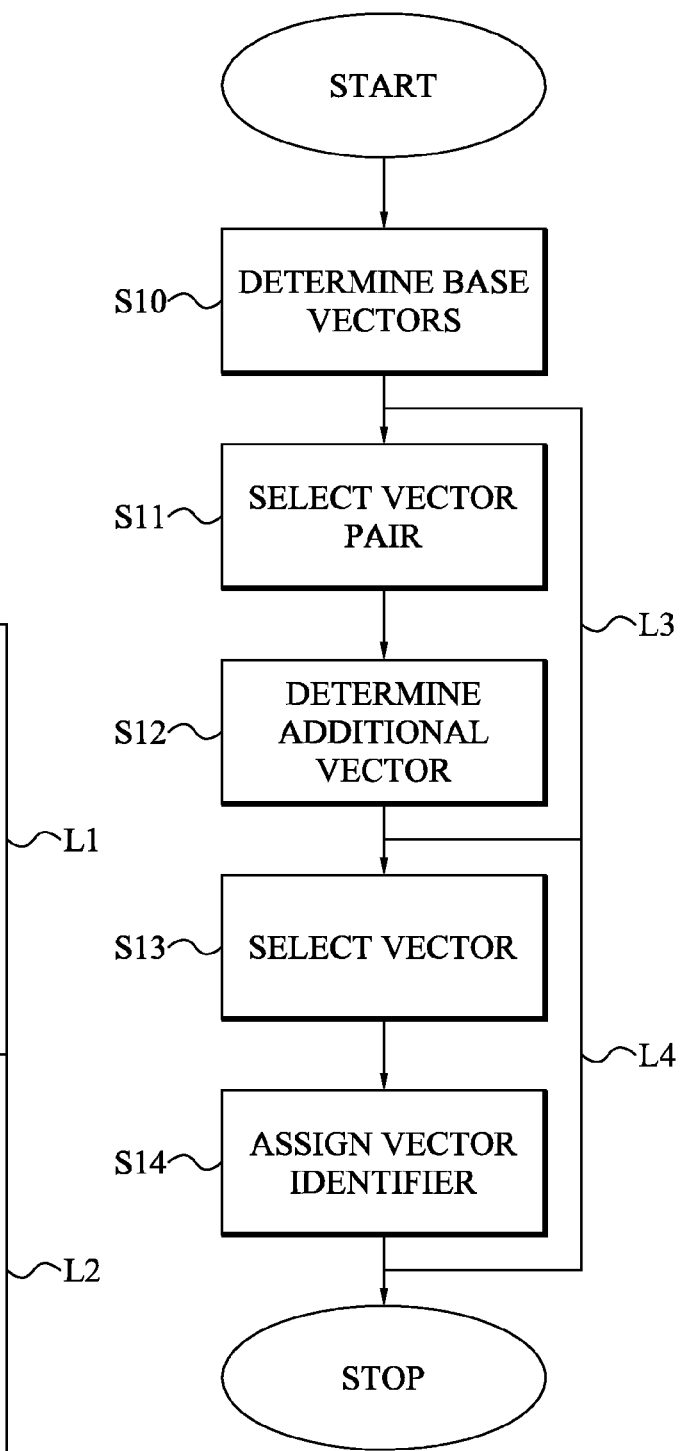
Fig. 1
Fig. 5

VECTOR-BASED IMAGE PROCESSING

This application is the U.S. national phase of International Application No. PCT/SE2008/050309, filed 19 Mar. 2008, which designated the U.S. and claims priority to U.S. Application No. 60/907,492 filed 4 Apr. 2007, the entire contents of each of which are hereby incorporated by reference.

TECHNICAL FIELD

The present invention generally relates to compressing and decoding images, and in particular to compressing and decoding blocks of feature vectors.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

Most texture compression schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each pixel to perturb the surface normal. A common approach to generate normal maps is to start with a high polygon count model and create a low complexity model using some geometrical simplification algorithm. The "difference" between these two models is then "baked" into a normal map. For real-time rendering, the normal map is applied to the low complexity model, giving it a more detailed appearance. For instance, the document [1] shows how it is possible to go from a very high triangle-count model (15000 polygons) to a very low one (1000 polygons) with preserved quality by using normal maps.

To be able to use lower polygon-count models is of course very attractive for mobile devices and terminals, since they have lower computational performance than PC systems.

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X,Y,Z), where $X^2+Y^2+Z^2=1$. The simplest scheme, is just to treat X,Y,Z as RGB (Red, Green, Blue) and compress it with S3TC/DXT1 [2], but that gives rather bad quality.

Actually, for smooth surfaces it turns out that even uncompressed RGB888/XYZ888 does not give enough quality for some objects. Especially for smooth surfaces, more than eight bits are needed. Therefore ATI Technologies developed 3Dc [1], which is a compression format that will often allow higher quality than XYZ888.

In 3Dc only X and Y are compressed, and Z is calculated using equation 1:

$$Z = \sqrt{1-X^2-Y^2} \quad (1)$$

X and Y are compressed separately. The X-values are grouped into blocks of 4×4 pixels. These values can range from −127.000 to +127.000, (or alternatively, from 0 to 255), but they are often clustered in an interval. 3Dc takes advantage of this and specifies this value using 16 bits: eight bits for the start of the interval and eight bits for the end of the interval.

Inside this interval, each value is specified using 3 bits each. This means that eight reconstruction levels within the interval are possible. The reconstruction levels are always equispaced (evenly spaced), reflecting an assumption that the distribution inside the interval is often close to uniform.

However, even 3Dc runs into problems in that it is not possible to compactly represent blocks in which the normals are distributed into multiple different clusters in vector space.

SUMMARY

The present invention overcomes these and other drawbacks of the prior art arrangements.

It is a general object of the present invention to provide efficient block encoding/compressing and block decoding/decompressing methods and systems.

This and other objects are met by the invention as defined by the accompanying patent claims.

Briefly, the present invention involves image processing in the form of compressing (encoding) an image and decompressing (decoding) a compressed (encoded) image.

According to the invention, an image to be compressed is decomposed into a number of blocks comprising multiple image elements (pixels, texture elements, texels, or volume elements, voxels). Each image element in a block is characterized by a feature vector, having two or three feature vector components. The image blocks are then compressed.

An embodiment determines at least four base vectors based on at least a portion of the feature vectors in the block. However, if four base vectors are determined, these are not positioned in the corners of a right-angled parallelogram in feature vector space. An order of the at least four base vectors is determined, where this order defines which base vectors that are regarded as neighboring vectors. At least one pair of neighboring base vectors as defined based on the vector order is selected. For this at least one selected pair of base vectors, at least one additional vector is calculated based on the vector pair. An image element of the block is encoded by selecting a vector among the at least four base vectors and the at least one additional vector as a representation of the feature vector of the image element. This selection is furthermore performed based on the feature vector of the image element. A vector identifier associated with the selected vector is assigned to the image element. The compressed or coded block therefore comprises representations of the at least four base vectors and a sequence of vector identifiers.

The compressed block is decompressed or decoded by providing at least four base vectors from the compressed block. At least one pair of the provided base vectors is selected as neighboring base vectors based on the order of the base vectors in the compressed block. At least one additional vector is calculated per selected vector pair and based on the base vectors in the respective pairs. An image element is decoded by using its assigned vector identifier provided in the compressed block to select a vector among the at least four base vectors and the at least one additional vector as decoded representation of the feature vector of the image element.

Another encoding or compressing embodiment comprises determining three base vectors based on at least a portion of the feature vectors in the image block. At least one additional vector is determined per pair of base vectors and based on the two base vectors of the pair. In the case the vector selection for an image element is performed among the three base vectors and the at least three additional base vectors. The vector that is the most suitable representation of the feature vector of the image element is selected and its associated vector identifier is assigned to the image element.

The compressed or coded block is decompressed or decoded by providing the three base vectors from the compressed block. At least one additional vector is determined for each pair of base vectors and based on the vectors in the pair. The vector identifier assigned to an image element and present in compressed block identifies which of the three base vectors and the at least three additional vectors to use as decoded representation of the feature vector of the image element.

The present invention also relates to a block compressor/encoder and a block decompressor/decoder.

The invention provides an efficient coding of blocks where the image elements have associated feature vectors, such as normals or color vectors. The invention is in particular advantageous in connection with processing such blocks where the feature vectors of a block are distributed in multiple clusters in feature vector space.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a method of compressing a block of image elements according to an embodiment of the present invention;

FIG. 5 is a flow diagram illustrating a method of compressing a block of image elements according to another embodiment of the present invention;

DETAILED DESCRIPTION

Figure 2:
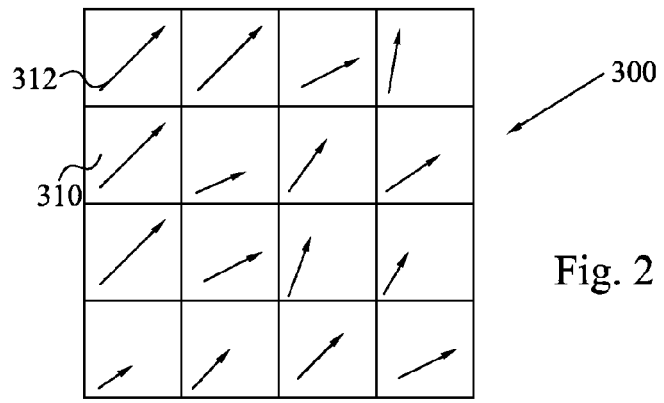
FIG. 2 is a schematic illustration of a block of image elements according to an embodiment of the present invention.

Throughout the drawings, the same reference characters will be used for corresponding or similar elements.

The present invention relates to image and graphic processing, and in particular to encoding or compressing images and blocks and decoding or decompressing encoded (compressed) images and blocks.

Generally, according to the invention, during image compression, an image is decomposed or divided into a number of blocks or tiles. Each such block then comprises multiple image elements having certain image element associated properties or features. The blocks are compressed to generate a compressed representation of the image.

When an encoded image or graphic primitive subsequently is to be rendered, e.g. displayed on a screen, the relevant image elements of the compressed blocks are identified and decompressed. These decompressed image elements are then used to generate a decompressed representation of the original image or graphics primitive.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for compressing other types of images or graphics, e.g. one-dimensional (1D), two-dimensional (2D) or 3D images.

The invention is in particular suitable for handling bump or normal maps, or images. As is well-known in the art, a normal or surface normal denotes a 3D vector which is perpendicular to the surface (for a flat surface) or perpendicular to the tangent plane of the surface (for a non-flat surface).

In the present invention the expression "image element" refers to an element in a block or compressed representation of a block. This block, in turn, corresponds to a portion of an image or texture. Thus, according to the invention, an image element could be a texel (texture element) of a (1D, 2D, 3D) texture, a pixel of a (1D or 2D) image or a voxel (volume element) of a 3D image. Generally, an image element is characterized by certain image-element properties or features. In the present invention, each image element has a feature vector representing a feature associated with the image elements. This feature could control or influence the appearance of an image element. A preferred embodiment of such a feature vector is a surface normal, more preferably a normalized surface normal. Such a surface normal has three vector components or coordinates, i.e. X-, Y- and Z-components. However, it is generally enough to only specify two of the normal coordinates, such as X- and Y-coordinates per image element, as the remaining coordinate can be calculated therefrom, such as using equation 1 above.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

The present invention provides an image processing that is in particular suitable for compressing and decompressing images and blocks, where each image element has a two dimensional feature vector. In a preferred implementation of the invention, the two vector components represent two coordinates of a normalized surface normal, such as the X- and Y-coordinates (or X- and Z-coordinates or Y- and Z-coordinates). In the following, the invention is described in connection with a feature vector comprising an X component and a Y component. However, this should merely be seen as an illustrative example as any other combination of two of the X, Y, Z components could instead be used. If non-normalized normals are employed, the third component is simply added and processed in a similar manner to the other two components as described herein.

The image processing of the present invention is well-adapted for handling blocks, where the normals (feature vectors) are grouped into multiple clusters in vector space. Such blocks are traditionally troublesome when employing a prior art normal processing scheme utilizing a rectangular grid of equispaced representations for the normals, such as 3Dc. In such a case, the majority of the 64 achievable equispaced normal representations will not be a suitable candidate for any of the normals in the block.

Compression/Coding

FIG. 1 illustrates a (lossy) method of compressing an image according to an aspect of the invention. The image is decomposed or divided into a number of blocks. Each such block comprises multiple, i.e. at least two, image elements. In a preferred embodiment of the invention, an block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of a block 300 with sixteen image elements 310 according to the present invention. The figure also schematically illustrates the different feature vectors or normals 312 associated with the image elements 310.

Step S1 determines at least four base vectors based on at least a portion of the feature vectors in the block. The four base vectors are preferably determined as respective representations of feature vectors in the block. Thus, each base vector can be selected among the (sixteen) feature vectors for the different image elements to be compressed. Furthermore, if four base vectors are determined in step S1, these four vectors are not positioned in the corners of a right-angled parallelogram (rectangular or square) in vector space.

A next step S2 defines a particular of the determined base vectors. This order defines which base vectors that are regarded as neighboring base vectors for the purpose of calculating additional vectors. Thus, if four base vectors are determined in step S1, $BV_1$, $BV_2$, $BV_3$, $BV_4$, three different orders can be defined $BV_1$-$BV_2$-$BV_3$-$BV_4$-$BV_1$, $BV_1$-$BV_2$-$BV_4$-$BV_3$-$BV_1$ and $BV_1$-$BV_3$-$BV_2$-$BV_4$-$BV_1$. Correspondingly, if five different base vectors are determined in step S1, twelve unique different orders of these vectors are possible.

Which base vectors that are neighboring vectors are dictated by the vector order. For instance, in the first listed order above for $BV_{1-4}$, $BV_1$ has two neighbor vectors $BV_2$ and $BV_4$, in the second order the neighbors are $BV_2$ and $BV_3$ while in the last case it is $BV_3$ and $BV_4$. The steps S1 and S2 can be implemented sequentially as illustrated in the figure or in parallel.

At least one pair of neighboring vectors of the determined base vectors is selected in step S3. The following step S4 calculates, for the selected vector pair, at least one additional vector based on the two base vectors of the pair. In a preferred embodiment, the at least one additional vector is determined as at least one vector pointing towards a point in vector space lying on a line connecting the end points of the selected pair of base vectors. In other words, the at least one additional vector $BV_A$ is determined as a linear combination of the two neighboring vectors $BV_i$, $BV_j$:

$$BV_A = \alpha (BV_i) + (1-\alpha) BV_j \qquad (2)$$

An embodiment of step S4 determines one additional vector per vector. In such a case the additional vector points towards a midpoint of the line connecting the end points of the two neighboring base vectors, i.e. α=0.5 in equation 2 above.

In another embodiment multiple additional vectors are determined per vector pair in step S4. For instance two additional vectors can be determined as different linear combinations of the two base vectors, such as by utilizing α=⅓ and α=⅔ or α=¼ and α=¾.

It is actually possible to have α<0 or α>1.0 in equation 2. In such a case, the additional vector will not end at a point positioned on a line between the end points of the two base vectors. In clear contrast, the additional vector ends on a point on the line beyond the base vectors.

In a preferred embodiment, steps S3 and S4 are performed at least twice utilizing different pairs of neighboring base vectors, which is schematically illustrated by the line L1. In such a case, step S3 involves selecting a first pair of base vectors determined in step S1 and being neighboring vectors according to the vector order defined in step S2. In addition, a second pair of neighboring base vectors (of which at least one base vector is different from the vectors of the selected first pair) is selected in step S3. Step S4 involves determining at least one first additional vector based on the first vector pair and at least one second additional vector based on the second pair.

A particular embodiment performs the steps S3 and S4 for each pair of neighboring base vectors according to the defined order. This means that if four base vectors are determined in step S1, the steps S3 and S4 are performed at least four times, one for each pair of two neighboring vectors.

Figure 3:
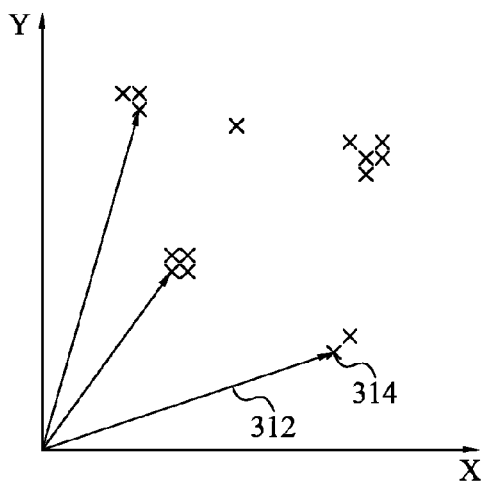
FIG. 3 is a diagram illustrating feature vectors of a block according to the present invention.
Figure 4A:
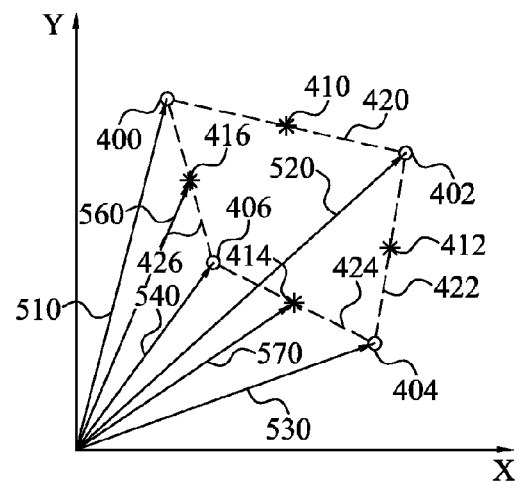
FIGS. 4A to 4C are diagrams illustrating base vector and additional vector determination according to different embodiments of the present invention.
Figure 4B:
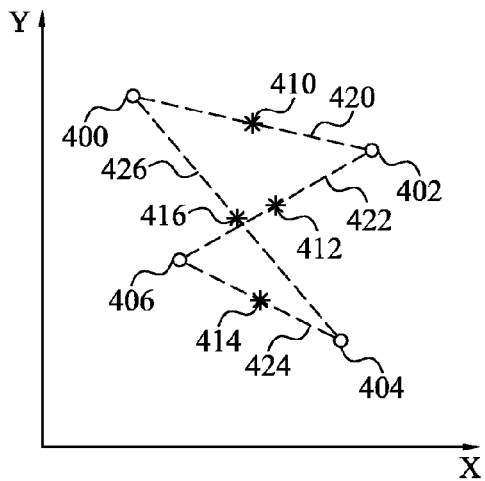
Figure 4C:
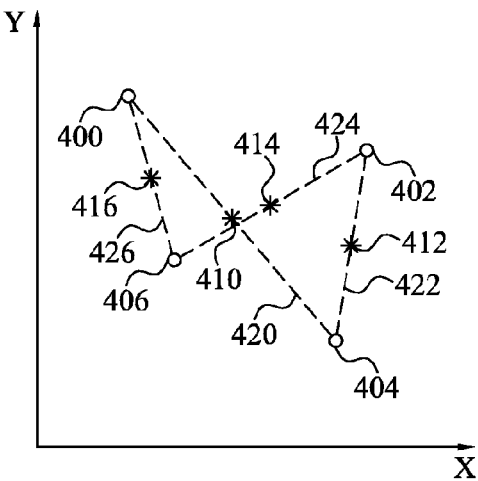

FIGS. 3 and 4A to 4C illustrates this concept of defining base vectors and selecting neighboring base vectors according to different vector order. FIG. 3 illustrates a portion of vector space in which feature vectors 312 of the image elements in a block are indicated. Only three vectors 312 are shown in the figure, while the remaining vectors are represented by their end points 314. These feature vectors 312 are to be compressed according to the present invention. Based on these feature vectors four base vectors are determined in the illustrated example. The base vectors are preferably selected among the feature vectors 312 in FIG. 3. In FIGS. 4A to 4C the four determined base vectors 510, 520, 530, 540 and their end points 400, 402, 404, 406 are indicated by circles. The figures also illustrate different vector orders of these base vectors 400, 402, 404, 406 by indicating lines 420, 422, 424, 426 between neighboring base vectors 400, 402, 404, 406. For instance, in FIG. 4A the first base vector 400 has a second 402 and a forth 406 base vector as neighboring vector, while in FIG. 4B (4C) the neighbors are the second 402 and a third 404 (the third 404 and the fourth 406) base vector.

Furthermore, the figures also illustrate additional vectors 560, 570 and their end points 410, 412, 414, 416. In the figures, one additional vector 560, 570 is calculated as linear combination of the neighboring base vectors 510, 520, 530, 540 of each vector pair. In addition, the respective end points 410, 412, 414, 416 of the additional vectors 560, 570 coincidence in this example with the midpoints of the lines 420, 422, 424, 426 interconnecting the end points 400, 402, 404, 406 of the neighboring base vectors 510, 520, 530, 540.

As is seen in the figures the actual vector component values of the additional vectors 560, 570 will depend on which of the available vector orders that is selected. This is a very important advantage of the present invention as for a same set of four base vectors 510, 520, 530, 540 three different sets of additional vectors 560, 570 can be achieved (in this particular example) for free, i.e. without spending any additional bits of the compressed block representation. Therefore one has the choice of three different sets of vectors when determining which particular vector distribution that best represents the original feature vectors 312 in FIG. 3. It is not hard to see in FIGS. 3 and 4A to 4C that the particular vector order illustrated in FIG. 4A will represent the feature vector distribution in FIG. 3 best, i.e. resulting in the smallest compression error of the three illustrated combinations.

Returning to FIG. 1, a next step S5 selects, for an image element in the block, a vector among the at least four base vectors from step S1 and the at least one additional vector from step S4 as a representation of the feature vector associated with the image element. This vector selection is further performed based on the feature vector of the image element. In a typical implementation, the vector having the end point that lies closest to the end point of the feature vector is selected in step S5 as this minimizes the compression error.

A next step S6 assigns a vector identifier or index associated with the selected vector to the image element. The steps S5 and S6 are preferably repeated for each image element in the block, which is schematically illustrated by line L2. This means that in such a case each image element of the resulting compressed block has an assigned vector identifier allowing identification of a vector among the base vectors and the at least one additional vector.

In a preferred embodiment, the selection of step S5 is performed among a vector set comprising the at least four base vectors and the at least one additional vector. In another embodiment, in particular when calculating multiple additional vectors for at least one pair of neighboring vectors, the vector selection is performed of a vector set only comprising the multiple additional vectors, i.e. the base vectors are not available as vector representations.

Steps S1 to S6 are preferably repeated for all blocks provided during the image decomposing. The result is then a sequence or file of compressed blocks. The resulting compressed blocks could be ordered in a file from left to right and top to bottom in the same order in which they were broken down in the block decomposing. The method then ends.

The compressed image can be provided to a memory for storage therein until a subsequent rendering, e.g. display, of the image. Furthermore, the compressed image can be provided as a signal of compressed block representations to a transmitter for (wireless or wired) transmission to another unit.

Figure 7:
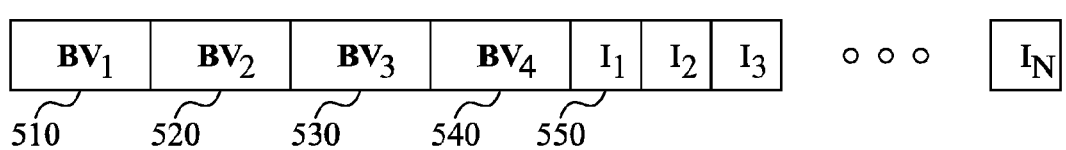
FIG. 7 is a schematic illustration of a compressed block according to an embodiment of the present invention.

The result of the block compression described above and disclosed in FIG. 1 is a compressed representation of the block. Such a compressed block representation 500 is illustrated in FIG. 7. The compressed block comprises a respective representation 510, 520, 530, 540 of the determined base vectors $BV_{1-4}$. The representations 510, 520, 530, 540 each preferably comprises two (or three) vector component representations corresponding to the two (or three) vector components of the base vectors.

If the feature base vectors each have P bits per vector component, the base vectors preferably have P bits per vector component. In such a case, the base vector representations 510, 520, 530, 540 could also have P bits per component, resulting in 2×P bits (or 3×P bits) per base vector representation 510, 520, 530, 540. In another embodiment, the vector components of the base vector representations 510, 520, 530, 540 and typically the base vectors contain fewer numbers of bits as compared to the vector components of the feature vectors. For instance, the base vector representations 510, 520, 530, 540 could be 2×M bits (or 3×M bits), where M<P. It is also possible to spend different number of bits per vector component, i.e. $M_1+M_2$ bits (or $M_1+M_2+M_3$ bits) per vector representation 510, 520, 530, 540.

The compressed block 500 also comprises the vector identifiers 550, preferably one such vector identifier 550 per image element of the block.

In a typical implementation having a block layout as illustrated in FIG. 2, i.e. N in FIG. 7 is sixteen, ten bits could be spent per vector component of the base vector representations 510, 520, 530, 540. This results in, in the case of 2D base vectors and four base vectors, 4×2×10=80 bits for the base vector representations 510, 520, 530, 540. Assuming that one additional vector is determined for each pair of neighboring base vectors implies there are in total eight different vectors (four base vectors plus four additional vectors) available as representations of the feature vectors. These eight different vectors can be identified using 3-bit vector indices 550. The sequence of vector identifiers 550 therefore preferably has, in this embodiment, a total length of 16×3=48 bits and the size of the compressed representation becomes 80+48=128 bits.

The present invention is not limited to the particular bit layout illustrated in FIG. 7. Actually any order of the including elements, i.e. base vector representations 510, 520, 530, 540 and vector identifiers 550, can be used as long as it is possible to, given the compressed block 500 to identify a vector order of the base vector representations 510, 520, 530, 540.

Figure 8:
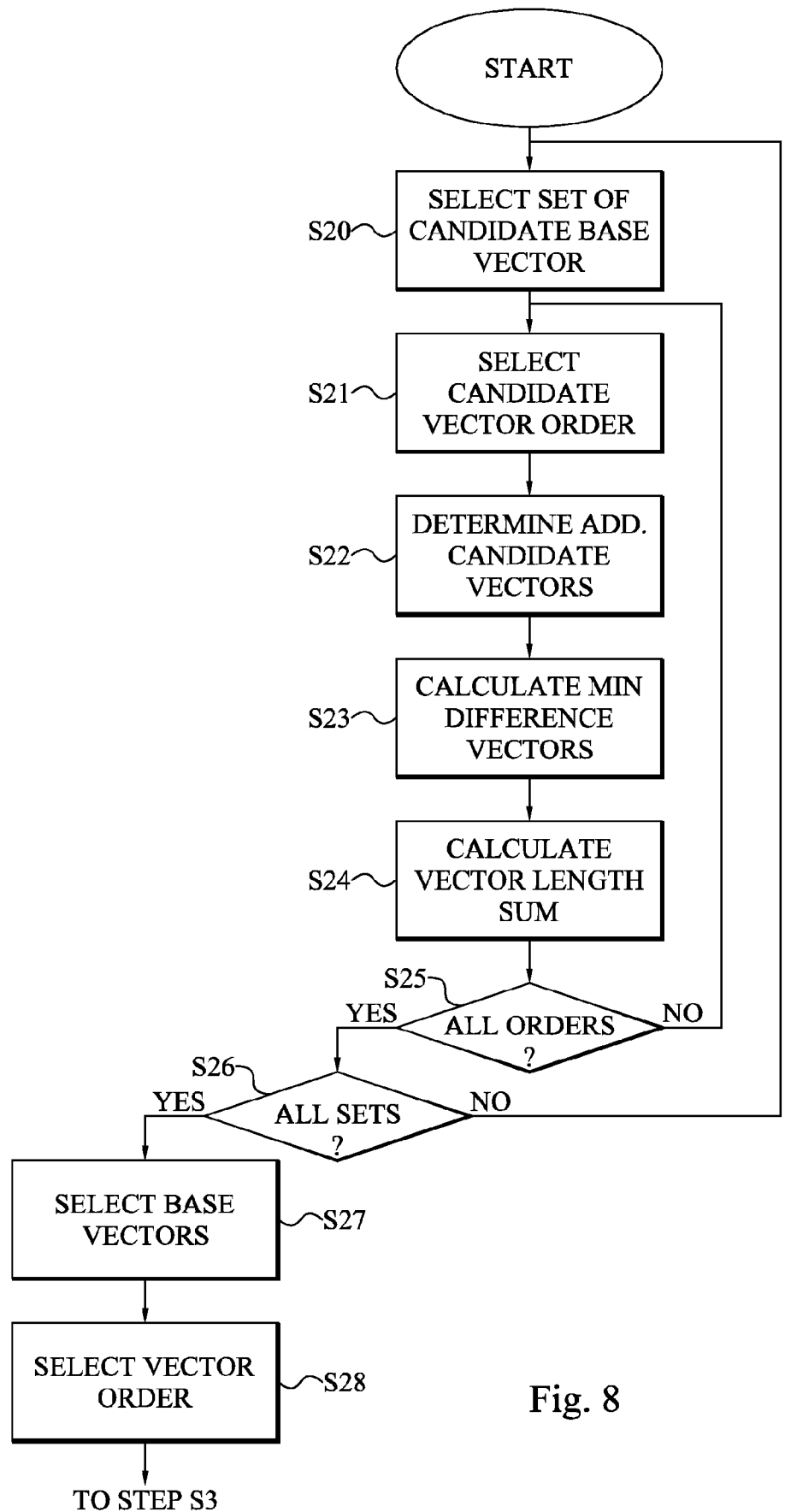
FIG. 8 is a flow diagram illustrating the base vector determining step and the vector order defining step of FIG. 1 in more detail according to an embodiment of the present invention.

FIG. 8 is a flow diagram illustrating a particular embodiment of the base vector determining and vector order defining steps of FIG. 1. This particular embodiment uses an error minimization procedure for determining base vectors and for defining the vector order.

The method starts in step S20 where a set of at least four feature vectors of the block is selected as candidate base vectors. A candidate order defining which candidate base vectors that are regarded as neighboring vectors is selected in step S21. At least one additional candidate vector is determined in step S22 for at least one pair of neighboring candidate base vectors. This step S22 preferably involves calculating one additional candidate vector per pair of neighboring candidate base vectors.

A minimum difference vector is calculated in step S23 between a feature vector associated with an image element and a candidate vector of the set of candidate base vectors and the at least one additional candidate vector. This minimum difference vector is thus the shortest difference vector among the difference vectors that are obtained by calculating a difference between the feature vector and each of the candidate vectors. This step S23 is performed for each feature vector, resulting in a respective minimum difference vector per image element in the block. Step S24 calculates a sum of the lengths of the minimum difference vectors calculated in step S23.

A next step S25 investigates whether all possible vector orders have been checked and a respective vector length sum has been calculated per order. If not the method continues to step S21 where a new candidate vector order is selected for the current set of candidate base vectors.

Once all candidate orders have been tested the method continues from step S25 to S26, which investigates if all sets of candidate base vectors have been tested. If not, the method continues to step S20, where a new set of at least four candidate base vectors are tested. In the case the selected set comprises four candidate base vectors and therefore there are three candidate vector orders per vector set $$3 \times \binom{16}{4} = 3 \times \frac{16!}{4!(16-4)!} = 3 \times 1820 = 5460$$

combinations need to be tested, thereby resulting in 5460 vector length sums.

Another possibility of providing the candidate vectors is to use "k-means" to get k candidate points. The k-means algorithm is a well-defined algorithm to cluster n objects based on attributes into k partitions, k<n.

Step S27 and step S28 select the candidate base vectors and candidate vector order resulting in the smallest vector length sum. The method then continues to step S3 of FIG. 8, where the selected base vectors and vector order are employed for the continuing block compression.

FIG. 5 is a flow diagram illustrating a method of compressing a block of image elements according to a particular embodiment of the present invention. This compression method is used for the case where three base vectors are determined per block, whereas the compression method described above in connection with FIG. 1 is applicable in those cases four or more base vectors are determined per block.

The method starts in step S10 where the three base vectors are determined based on at least a portion of the feature vectors. This step S10 is preferably performed in a similar manner to step S1 described above with the main difference that only three base vectors are selected. As a consequence, the base vectors are preferably selected among the feature vectors of the block. In this an exhaustive search among the possible combinations of three base vectors among sixteen base vectors would amount to testing $$\binom{16}{3} = \frac{16!}{3!(16-3)!} = 560$$

combinations.

A next step S11 selects a pair of base vectors and step S12 determines at least one additional vector per such pair. These steps S11 and S12 are performed for each pair of base vectors as indicated by the line L3. In this case this means that the steps are performed three times, resulting in at least six vectors (three base vectors plus at least three additional vectors). The determination of additional vectors of step S12 is preferably performed as previously described, where the additional vectors are linear combinations of the pair of base vectors.

Step S13 selects a vector among the three base vectors and the multiple additional vectors based on a feature vector associated with an image element. The selected vector is employed as representation of the feature vector of that image element. Finally step S14 assigns a vector identifier to the image element, where this vector identifier is associated with and allows identification of the selected vector. Steps S13 and S14 are preferably repeated for each image element in the block to thereby obtain a compressed representation of the block. In clear contrast to the block representation in FIG. 7, in this embodiment the compressed block only comprises three base vector representations in addition to the sequence of vector identifiers.

Figure 6:
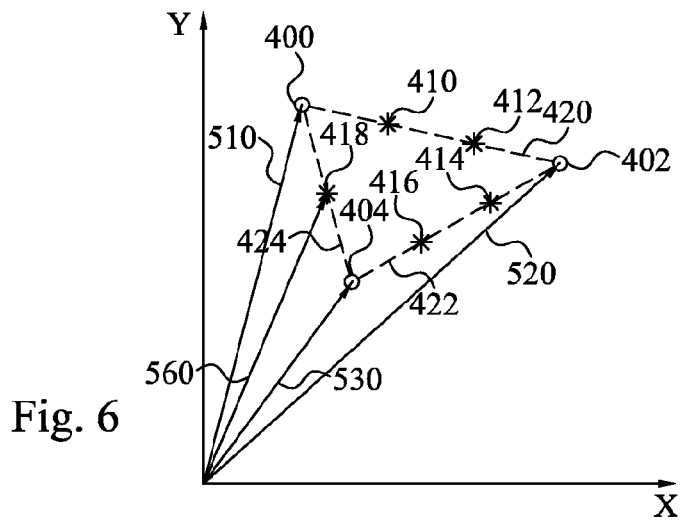
FIG. 6 is a diagram illustrating base vector and additional vector determination according to an embodiment of the present invention.

FIG. 6 illustrates the principles with the compression embodiment discussed above in connection with FIG. 5. The figure illustrates three base vectors 510, 520, 530 and their respective end points are indicated by circles 400, 402, 404. One additional vector 560 has been indicated in the figure, while for the remaining additional vectors calculated as linear combinations of pairs of base vectors 510, 520, 530 their respective end points have been indicated by stars 412, 414, 416, 418. The figure also illustrates, as has been discussed in the foregoing, that multiple, in FIG. 6 two, additional vectors (having end points 414, 416) can be determined per pair of neighboring base vectors 402, 404.

Decompression/Decoding

Figure 9:
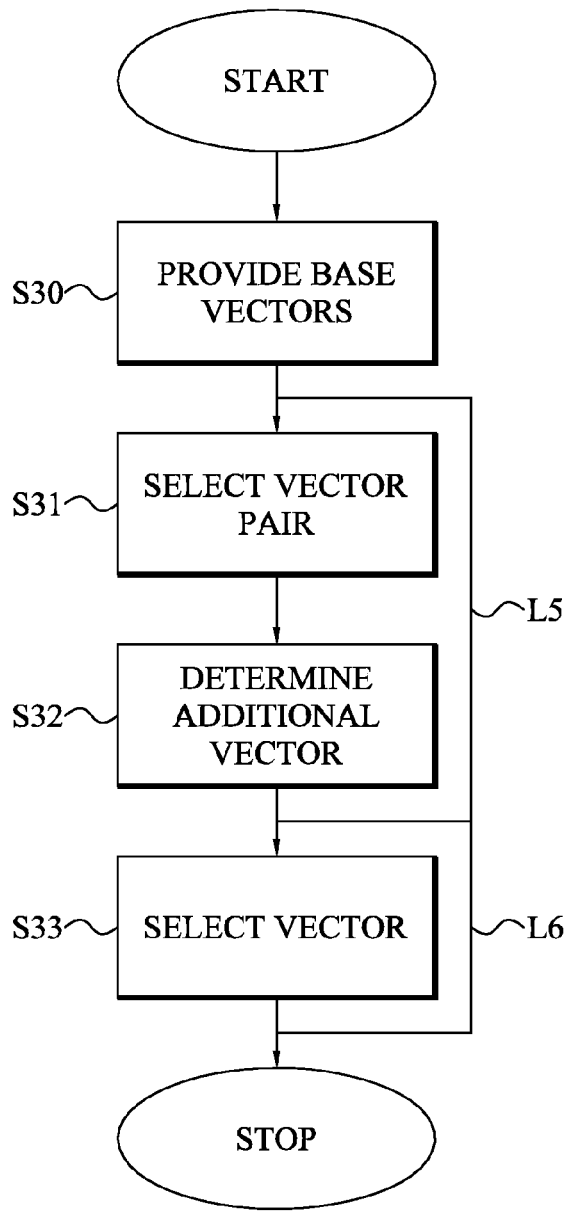
FIG. 9 is a flow diagram illustrating a method of decoding a compressed block according to an embodiment of the present invention.

FIG. 9 illustrates a flow diagram of a method of decompressing a compressed image according to the present invention. The compressed image basically comprises several compressed representations of blocks. These block representations are preferably generated by the image compressing method discussed above.

The method generally starts by identifying compressed block(s) to decompress. It could be possible that all blocks of a compressed image should be decompressed to generate a decompressed representation of the original image. Alternatively, only a portion of the original image is to be accessed. As a consequence, only a selected number of blocks have to be decompressed (or more precisely, a selected number of image elements of certain blocks have to be decoded).

Once the correct compressed block(s) is identified, step S30 provides, in this embodiment, at least four base vectors based on the compressed block. These at least four base vectors are obtained from the base vector representations included in the compressed block and indicated in FIG. 7. The provision can be performed simply by retrieving the respective bit combination for the different vector representations and use them directly as base vectors. For instance, if a base vector representation in the compressed block comprises P bits, the retrieved base vector will contain P bits. In an alternative embodiment the base vector representation comprises M bits, where M<P. In such a case the retrieved M-bit sequence can be expanded or extended in step S30 into a P bit sequence constituting the base vector. This bit expansion can be realized by replicating the P-M least significant bits (or most significant bits) of the M-bit sequence and adding them as the most significant bits (or least significant bits) to form a P-bit sequence.

As was discussed above, if four base vectors are provided in step S30 the base vectors are not positioned in the corners of a right-angled parallelogram in feature vector space.

A next step S31 selects at least one pair of base vectors as neighboring base vectors. This selection is preferably performed on an order of the base vector representations in the compressed block. Thus, in a typical implementation, the first base vector in the compressed block will be neighbor to the second base vector in the block and the last base vector. The second base vector has also two neighboring vectors, the first and third vector as laid out in the compressed bit sequence. It is anticipated by the present invention that another predefined order could be used as long as it is possible to clearly identify, given a particular base vector representation position in the compressed block, which two base vector representations that are regarded as its neighboring vectors.

The next step S32 determines at least one additional vector based on the selected pair of neighboring base vectors. This vector determination is preferably performed by calculating the at least one additional vector as a linear combination of the two neighboring base vectors as previously described in connection with step S4 of FIG. 1. This determination could determine one additional vector, the vector weights are then both preferably 0.5, i.e. the additional vector points towards the midpoint of a line interconnecting the end points of the neighboring vectors. Alternatively multiple additional vectors are determined in step S32 for the vector pair.

Steps S31 and S32 could be performed once for a single neighboring base vector pair. However, in a preferred embodiment the steps are preferably performed at least twice for different vector pairs and typically performed once per neighboring pair, which is schematically illustrated by line L5. In such a case at least one additional vector is determined per selected pair of neighboring vectors.

The method then continues to step S33 where a vector is selected for an image element in the block and among the at least four base vectors and the determined at least one additional vectors. The selected vector is then employed as the decoded representation of the original feature vector of the image element. The vector selection is performed based on the vector identifier or index associated with the image element and included in the compressed block, see FIG. 7.

Step S33 could be performed for several image elements in the block (schematically illustrated by line L6). It is anticipated by the invention that in some applications, only a single image element is decoded from a specific block, multiple image elements of a specific block are decoded and/or all the image elements of a specific block are decoded.

Steps S30 to S33 are then preferably repeated for all blocks that comprise image elements that should be decoded. This means that the loop of steps S30 to S33 could be performed once, but most often several times for different compressed blocks and/or several times for a specific compressed block.

A decompressed representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

Figure 10:
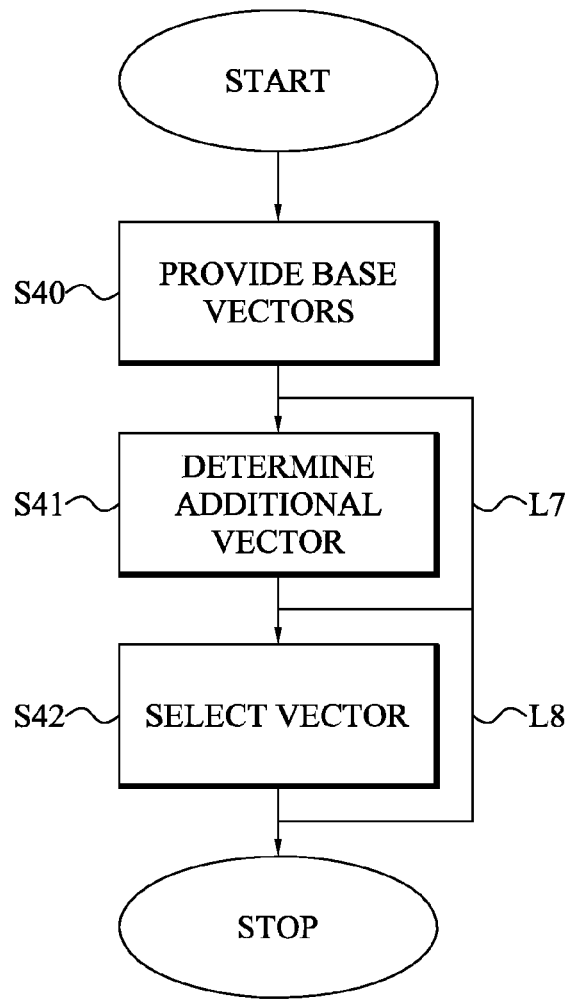
FIG. 10 is a flow diagram illustrating a method of decoding a compressed block according to another embodiment of the present invention.

FIG. 10 is a corresponding flow diagram for the decoding embodiment of the present invention comprising three base vectors per block. The decoding method is performed similar to what is described above unless otherwise specified herein. The actual block decoding starts in step S40 where three base vectors are provided based on the compressed block. The provision could be a simple bit sequence retrieval or such a retrieval followed by bit expansion as discussed in connection with step S30 of FIG. 9. A next step S41 determines at least one additional vector based on a pair of provided base vectors. This determination can involve calculating one or more additional vectors for the given vector pair. The calculation is preferably performed as discussed in connection with step S32 of FIG. 9, i.e. as linear combination of the pair of base vectors. This step S41 is performed once for each pair of base vectors in the compressed block in this embodiment, i.e. three times, resulting in total in at least three additional vectors.

The next step S42 selects a vector among the three base vectors and the at least three additional vectors as decoded representation of a feature vector of an image element. This selection is furthermore performed based on the vector identifier associated with the image element. As was discussed in connection with step S33 of FIG. 9, the vector selection can be performed once or multiple times for different image elements (schematically illustrated by the line L8). The method then ends or starts anew for a new compressed block of the image.

Decoding Example

A compressed block layout as illustrated in FIG. 7 and a block size as illustrated in FIG. 2 are assumed in this illustrative but non-limiting coding example.

11001100 11110100 11111111 01011001
00001100 10010100 10011000 11011011
001 . . . 010

The first nine bits comprises to the X component of the first base vector and the following nine bits is the Y component. Thereafter follows the X and Y components of the three other base vectors:

$11001100_{bin}=102.0$
$11110100_{bin}=122.0$
$11111101_{bin}=254.5$
$01011001_{bin}=44.5$
$00001100_{bin}=6$
$10010100_{bin}=74$
$10011001_{bin}=76.5$
$11011010_{bin}=109.0$ In this example the first eight bits per 9-bit sequence are integer bits while the least significant bit is a fractional bit. The four base vectors, thus, become (102.0, 122.0), (254.5, 44.5), (6, 74) and (76.5, 109.0). Assume that one additional vector is calculated per pair of neighboring vectors and that the order is as contained in the compressed block. The additional then become, with vector weights equal to 0.5:

$$0.5\times(102.0,122.0)+0.5\times(254.5,44.5)=(178.25,83.25)$$

$$0.5\times(254.5,44.5)+0.5\times(6,74)=(130.25,59.25)$$

$$0.5\times(6,74)+0.5\times(76.5,109.0)=(41.25,91.5)$$

$$0.5\times(76.5,109.0)+0.5\times(102.0,122.0)=(89.25,115.5)$$

Each vector then has an associated vector identifier, e.g. as illustrated by Table 1.

TABLE 1

| vector identifiers | |
|---|---|
| Vector identifier | Vector |
| $000_{bin}$ | (102.0, 122.0) |
| $001_{bin}$ | (178.25, 83.25) |
| $010_{bin}$ | (254.5, 44.5) |
| $011_{bin}$ | (130.25, 59.25) |
| $100_{bin}$ | (6, 74) |
| $101_{bin}$ | (41.25, 91.5) |
| $110_{bin}$ | (76.5, 109.0) |
| $111_{bin}$ | (89.25, 115.5) |

The first image element has assigned vector identifier $001_{bin}$, which corresponds according to Table 1 to (178.25, 83.25) and the last image element has identifier $010_{bin}$, which is (254.5, 44.5).

If a remapping into the interval [−1, 1] is used these values become: 2×178.25/255−1=0.40 and 2×83.25/255−1=0.35 for the first image element. The Z-coordinate representation for the first image element is then calculated, using equation 1, from these two remapped values: $\sqrt{1-(0.40)^2-(-0.35)^2}=0.85$. Thus, the normal representation for the first image element is (X,Y,Z)=(0.40, −0.35, 0.85).

The same procedure is performed for the other image elements in the block to be decoded.

Implementation Aspects

The block (image) compression and block (image) decompression scheme according to the present invention could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

Figure 11:
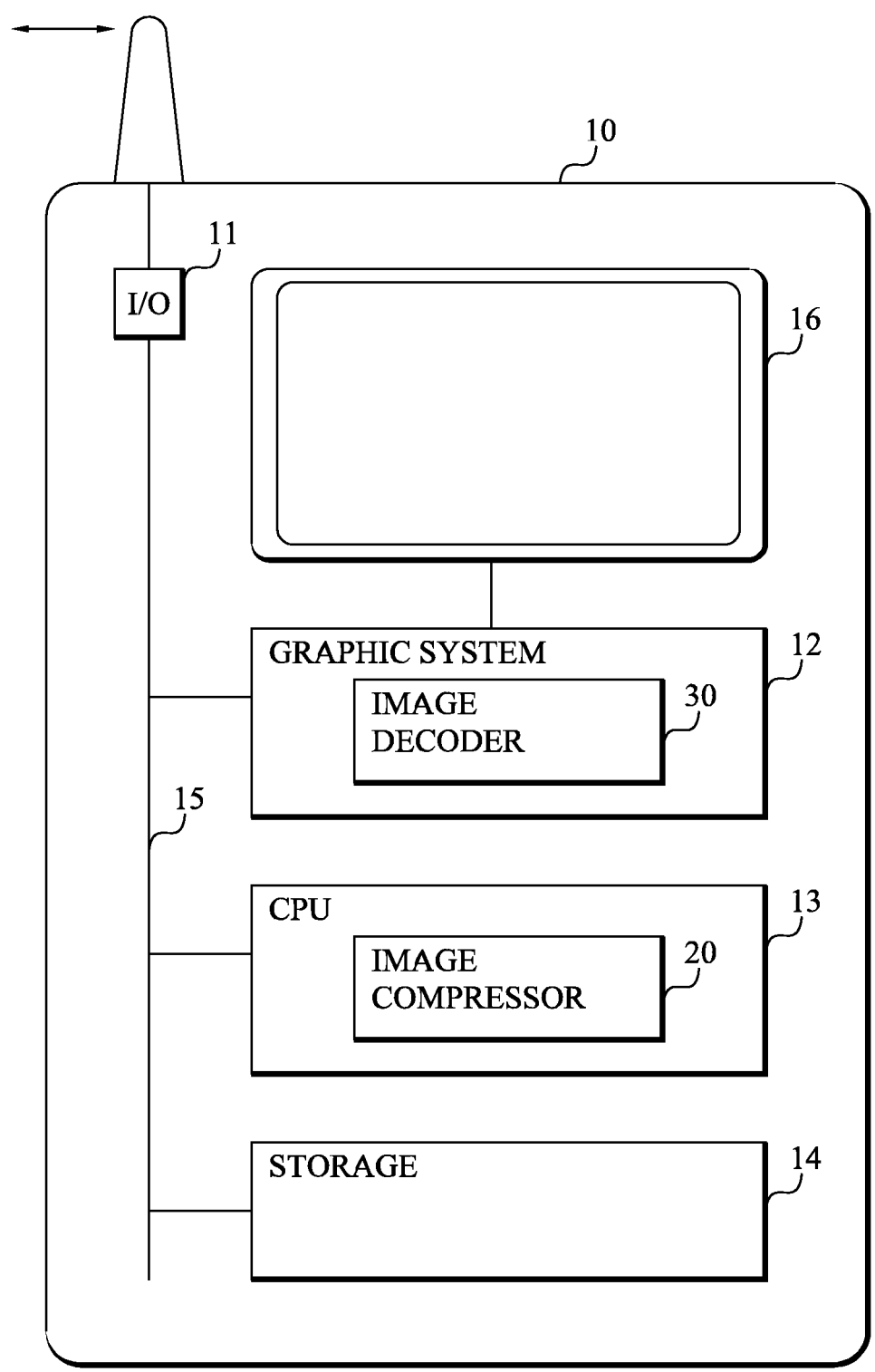
FIG. 11 is block diagram of a user terminal equipped with an image compressor and image decoder according to the present invention.

FIG. 11 illustrates a user terminal 10 represented by a mobile unit. However, the invention is not limited to mobile units but could be implemented in other terminals and data processing units, such as PC computers and game consoles. Only means and elements in the mobile unit 10 directly involved in the present invention are illustrated in the figure.

The mobile unit 10 comprises a (central) processing unit (CPU) 13 for processing data, including image data, within the mobile unit 10. A graphic system 12 is provided in the mobile unit 10 for managing image and graphic data. In particular, the graphic system 12 is adapted for rendering or displaying images on a connected screen 16 or other display unit. The mobile unit 10 also comprises a storage or memory 14 for storing data therein. In this memory 14 image data may be stored, in particular compressed image data according to the present invention.

An image compressor 20 according to the present invention is typically provided in the mobile unit 10. This compressor 20 is configured for compressing an image or texture into a compressed representation of the image. As was discussed above, such a compressed representation comprises a sequence or file of multiple compressed blocks. This image compressor 20 may be provided as software running on the CPU 13, as is illustrated in the figure. Alternatively, or in addition, the compressor 20 could be arranged in the graphic system 12 or elsewhere in the mobile unit 10.

A compressed representation of an image from the block compressor 20 may be provided to the memory 14 over a (memory) bus 15, for storage therein until a subsequent rendering of the image. Alternatively, or in addition, the compressed image data may be forwarded to an input and output (I/O) unit 11 for (wireless or wired) transmission to other external terminals or units. The I/O unit 11 could, for instance, represent the transmitter and receiver chain of the user terminal. The I/O unit 11 can also be adapted for receiving image data from an external unit. This image data could be an image that should be compressed by the image compressor 20 or compressed image data that should be decompressed. It could also be possible to store the compressed image representation in a dedicated texture memory provided, for example, in the graphic system 12. Furthermore, portions of the compressed image could also, or alternatively, be (temporarily) stored in a texture cache memory, e.g. in the graphic system 12.

An image decompressor 30 according to the present invention is typically provided in the mobile unit 10 for decompressing a compressed image in order to generate a decompressed image representation. This decompressed representation could correspond to the whole original image or a portion thereof. The image decompressor 30 provides decompressed image data to the graphic system 12, which in turn typically processes the data before it is rendered or presented on the screen 16. The image decompressor 30 can be arranged in the graphic system 12, as is illustrated in the figure. Alternatively, or in addition, the decoder 30 can be provided as software running on the CPU 13 or elsewhere in the mobile unit 10.

The mobile unit 10 could be equipped with both an image compressor 20 and an image decompressor 30, as is illustrated in the figure. However, for some terminals 10 it could be possible to only include an image compressor 20. In such a case, compressed image data could be transmitted to another terminal that performs the decompression and, possibly, rendering of the image. Correspondingly, a terminal 10 could only include an image decompressor 30, i.e. no compressor. Such a terminal 10 then receives a signal comprising compressed image data from another entity and decompresses it to generate a decompressed image representation. Thus, the compressed image signal could be wirelessly be transmitted between terminals using radio transmitter and receiver. Alternatively, other techniques for distributing images and compressed image representations between terminals according to the invention could be employed, such as BLUETOOTH®, IR-techniques using IR ports and wired transferring of image data between terminals. Also memory cards or chips, including USB memory, which can be connected and exchanged between terminals could be used for this image data inter-terminal distribution.

The units 11, 12, 13, 20 and 30 of the mobile unit 10 may be provided as software, hardware or a combination thereof.

Image Encoder

Figures 12, 16:
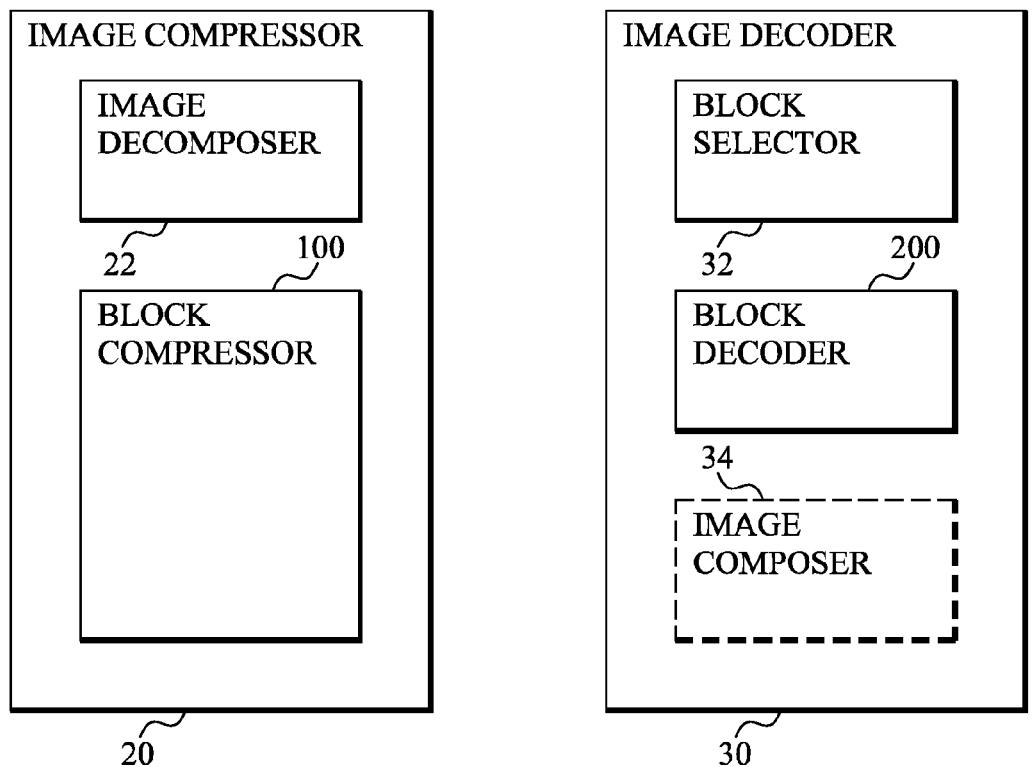
FIG. 12 is a block diagram of an image compressor according to an embodiment of the present invention.
FIG. 16 is a block diagram of an image decoder according to an embodiment of the present invention.

FIG. 12 illustrates a block diagram of an embodiment of an image compressor 20 according to the present invention. The compressor 20 typically comprises an image decomposer 22 for decomposing or dividing an input image into several blocks of multiple image elements. The decomposer 22 is preferably configured for decomposing the image into blocks comprising sixteen image elements (pixels, texels or voxels), i.e. having a general size of 4×4 image elements. This decomposer 22 could be adapted for decomposing different input images into blocks with different sizes. In such a case, the decomposer 22 preferably receives input information, enabling identification of which block format to use for a given image.

This embodiment of the image compressor 20 comprises a block compressor 100. This block compressor 100 compresses the block(s) received from the image decomposer to generate compressed block representation(s). The overall size of the block representation is smaller than the corresponding size of the uncoded block. The block compressor 100 is preferably configured for processing (encoding) each block from the decomposer 22 sequentially.

In an alternative implementation, the compressor 20 includes multiple block compressor 100 for processing multiple blocks from the image decomposer 22 in parallel, which reduces the total image encoding time.

The units 22 and 100 of the image compressor 20 may be provided as software, hardware or a combination thereof. The units 22 and 100 may be implemented together in the image compressor 20. Alternatively, a distributed implementation is also possible with some of the units provided elsewhere in the image processing terminal.

Block Encoder

Figure 13:
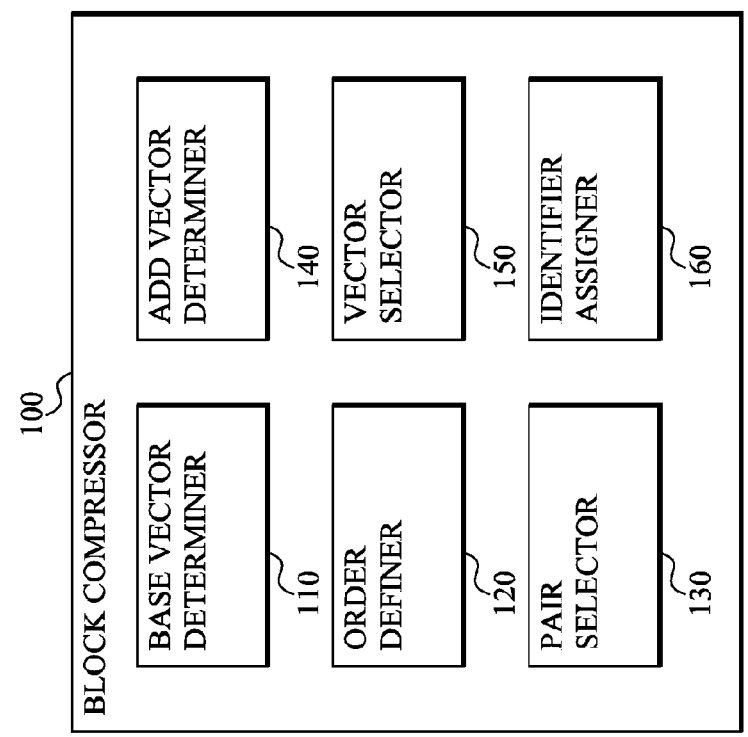
FIG. 13 is a block diagram of a block compressor according to an embodiment of the present invention.

FIG. 13 illustrates a block diagram of an embodiment of a block compressor 100 according to the present invention, such as the block compressor of the image compressor in FIG. 12. The compressor 100 comprises a base vector determiner 110 arranged for determining at least four base vectors for a current block to be compressed. The vector determines uses at least a portion of the feature vectors of block to determine the base vectors, preferably by selecting at least four feature vectors and use them or processed (such as quantized) versions thereof as base vectors. In the case four base vectors are determined, these does not form the corners of a right-angled parallelogram in feature vector space.

An order definer 120 is arranged in the compressor 100 for defining a particular vector order of the base vectors determined by the vector determiner 110. This vector order defines which of the determined base vectors that are regarded as neighboring base vectors. The definer 120 preferably defines the vector order base at least partly on at least a portion of the feature vectors of the block.

The compressor 100 also comprises a pair selector 130 adapted to select at least one pair of base vectors of the at least four base vectors as neighboring vectors according to the vector order from the order definer 120.

An additional vector determiner 140 determines at least one additional vector for a pair of neighboring base vectors selected by the pair selector 130. The determiner 140 uses base vectors of the pair and calculates the at least one additional vector based thereon, preferably as a linear combination of the two base vectors. The determiner 140 could determine one additional vector, preferably by using vector weights of 0.5 for the two base vectors, or multiple additional vectors per selected vector pair.

The pair selector 130 could select multiple pairs of neighboring base vectors. In such a case, the determiner 140 preferably calculates at least one additional vector per selected vector pair. The vector determiner 140 could use the same vector weights and calculate the same number of additional vectors per selected pair or indeed have different weights and/or different number of additional vectors for different neighboring vector pairs. However, in such a case the determiner 140 is then preferably pre-configured to use a first set of weights and a first number of additional vectors for the first neighboring vector pair, a second set of weight and a second number of additional vectors for the second vector pair and so on. This means that the same weights and number of additional vectors are preferably used for different blocks to be compressed by the block compressor 100 to thereby relax the need for explicit signaling of this kind of information between the compressor 100 and a block decompressor.

A vector selector 150 is implemented in the block compressor 100 for selecting, for at least one image element in the block, a vector among the at least four base vectors from the base vector determiner 110 and the at least one additional vector from the additional vector determiner 140. The selector 150 furthermore performs the selection based on the feature vector of the image element by preferably selecting the vector resulting in a smallest vector length of a difference vector between the feature vector and a vector among the base and additional vectors. In a preferred embodiment, the vector selector 150 has access to both the base and additional vectors, while in another embodiment the selection is only performed among multiple additional vectors.

The block compressor 100 comprises an identifier assigner 160 arranged for assigning a vector identifier to the processed image element. This vector identifier is furthermore associated with and allows identification of the vector selected by the vector selector 150. The vector selector 150 and the identifier assigner 160 preferably selects vector and assigns vector identifier for each image element in the block to thereby obtain a compressed representation of the compressed block comprising representations of the base vectors and a sequence of vector identifiers.

The units 110 to 160 of the block compressor 100 may be provided as software, hardware or a combination thereof. The units 110 to 160 may be implemented together in the block compressor 100. Alternatively, a distributed implementation is also possible with some of the units provided elsewhere in the image compressor.

Figure 14:
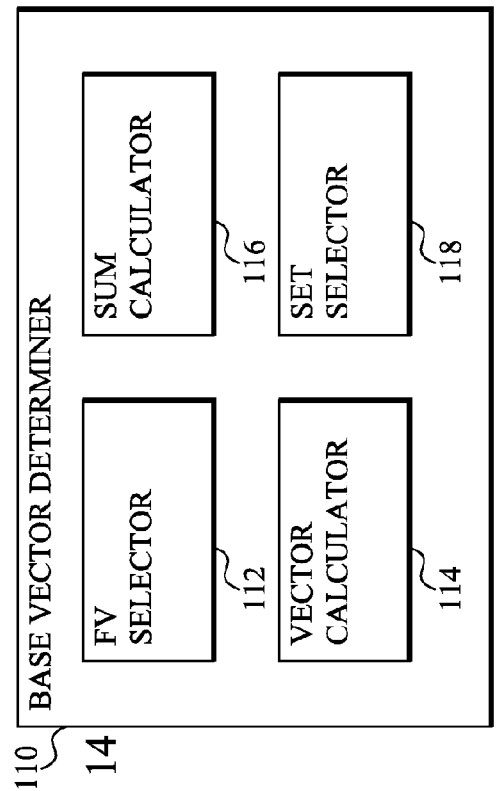
FIG. 14 is a block diagram of an embodiment of the base vector determiner of FIG. 13.

FIG. 14 is a schematic block diagram of an embodiment of the base vector determiner 110 of FIG. 13. The determiner 110 comprises a feature vector selector 112 adapted to select a set of at least four feature vectors of the block as candidate base vectors. The order definer of the block compressor of FIG. 13 defines different candidate vector orders for the candidate base vectors. The additional vector determiner of the block compressor calculates, for each defined candidate order, at least one candidate additional vector based on a pair of neighboring candidate base vectors selected based on a candidate vector order.

A vector calculator 114 is provided in the vector determiner 110 for calculating, for each feature vector of the block, for each available candidate vector order and for each set of at least four feature vectors, a minimum difference vector between the feature vector and a vector selected from the at least four candidate base vectors and the at least one candidate additional vector. The minimum difference vector corresponds to the vector having shortest length of the difference vectors from the particular feature vector and a vector of the candidate base and additional vectors.

A sum calculator 116 is provided to calculate a sum of the lengths of the minimum difference vectors for each available candidate order and each set. A set selector 118 selects the at least four base vectors used as candidate base vectors in the set resulting in the smallest sum of the vector lengths. Furthermore, the order definer of the block compressor of FIG. 13 selects the defined order used in the set and order combination resulting in the smallest sum of vector lengths.

The units 112 to 118 of the base vector determiner 110 may be provided as software, hardware or a combination thereof. The units 112 to 118 may be implemented together in the base vector determiner 110. Alternatively, a distributed implementation is also possible with some of the units provided elsewhere in the block compressor.

Figure 15:
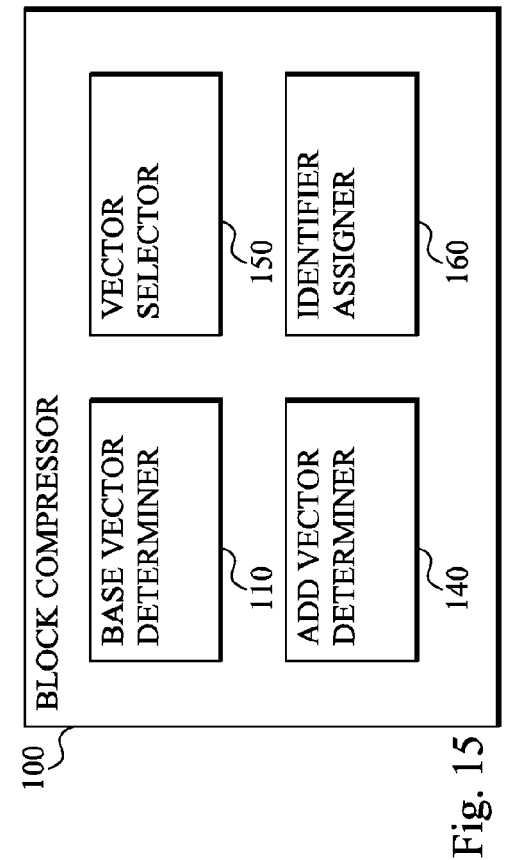
FIG. 15 is a block diagram of a block compressor according to another embodiment of the present invention.

FIG. 15 is a schematic block diagram of another embodiment of the block compressor 100 of the present invention that can be implemented in the image compressor of FIG. 12. The compressor 100 comprises a base vector determiner 110 that, in this embodiment, is adapted to determine three base vectors for the current block to be compressed. The base vectors are determined based on at least a portion of the feature vectors of the block and are preferably selected among these feature vectors in a compression error minimization procedure as previously described.

An additional vector determiner 140 is provided for determining at least one additional vector for each pair of base vectors from the vector determiner 110. More than one additional vector can be determined per vector pair and different number of additional vectors can be determined for different pairs. However, the same number of additional vectors is preferably determined for the vector pairs when the compressor 100 compresses a second block as when compressing a first block. At least one of different embodiments of calculating the additional vectors discussed above can be used by the additional vector determiner 140.

A vector selector 150 is provided in the compressor 100 for selecting a vector among the three base vectors and the at least three additional vectors for an image element in the block. The selector 150 utilizes the feature vector associated with the image element in the vector selection and preferably selecting the vector that minimizes the vector length between the feature vector and the vector of the base and additional vectors.

The compressor 100 also comprises an identifier assigner 160 arranged for assign a vector identifier 160 for the image element, where this identifier is associated with the vector selected by the vector selector 150. The selector 150 and assigner 160 are preferably operable to process all image elements in the block, thereby resulting in N vector identifiers in the case of N image elements in the block.

The units 110 to 160 of the block compressor 100 may be provided as software, hardware or a combination thereof. The units 110 to 160 may be implemented together in the block compressor 100. Alternatively, a distributed implementation is also possible with some of the units provided elsewhere in the image compressor.

Image Decoder

FIG. 16 illustrates a block diagram of an embodiment of an image decompressor 30 according to the present invention. The image decompressor 30 preferably comprises a block selector 32 that is adapted for selecting, e.g. from a memory, which encoded block(s) that should be provided to a block decompressor 200 for decompression. The block selector 32 preferably receives input information associated with the compressed image data, e.g. from a header or a rendering engine. An address of a compressed block having the desired image element(s) is then computed based on the input information. This computed address is preferably dependent upon the image-element (pixel, texel or voxel) coordinates within an image. Using the address, the block selector 32 identifies the compressed block from the memory. This identified compressed image block is then fetched from the storage and provided to the block decompressor 200.

The (random) access to image elements of an image block advantageously enables selective decompression of only those portions of an image that are needed. Furthermore, the image can be decompressed in any order the data is required. For example, in texture mapping only portions of the texture may be required and these portions will generally be required in a non-sequential order. Thus, the image decompression of the present invention can with advantage by applied to process only a portion or section of an image.

The selected compressed block is then forwarded to the block decompressor 200. In addition to the image block, the decompressor 200 preferably receives information specifying which image elements of the block that should be decoded. The information could specify that the whole image block, i.e. all image elements therein, should be decoded. However, the received information could identify only a single or a few of the image elements that should be decoded. The block decompressor 200 then generates a decompressed representation of the image element(s) in the block.

An optional image composer 34 could be provided in the image decompressor 30. This composer receives the decoded image elements from the block decompressor 200 and composes them to generate a pixel that can be rendered or displayed on a screen. This image composer 34 could alternatively be provided in the graphic system.

Alternatively, the image decompressor 30 comprises multiple block decompressors 200. By having access to multiple block decompressors 200, the image decoder 30 can process multiple encoded image blocks in parallel. These multiple block decompressors 200 allow for parallel processing that increases the processing performance and efficiency of the image decompressor 30.

The units 32, 34 and 200 of the image decompressor 30 may be provided as software, hardware or a combination thereof. The units 32, 34 and 200 may be implemented together in the image decompressor 30. Alternatively, a distributed implementation is also possible with some of the units provided elsewhere in the user terminal.

Block Decoder

Figure 17:
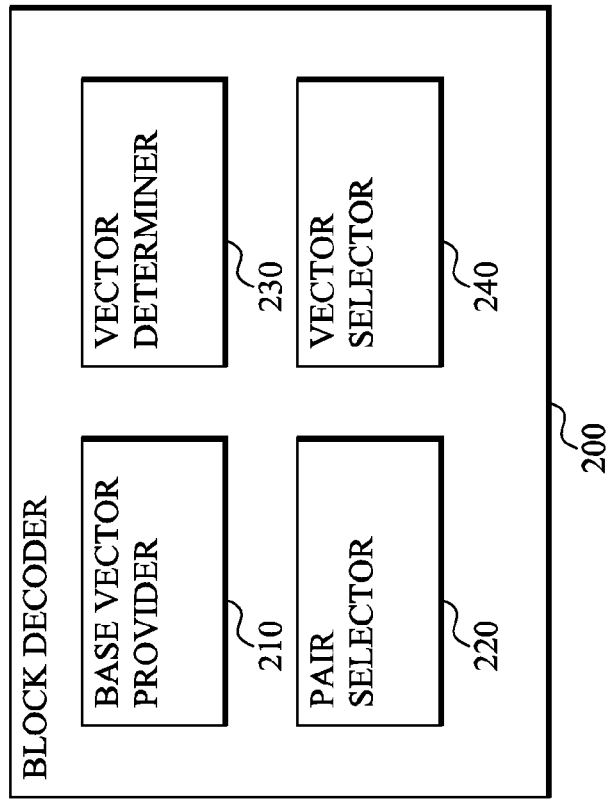
FIG. 17 is a block diagram of a block decoder according to an embodiment of the present invention.

FIG. 17 is an illustration of an embodiment of a block decompressor or decoder 200 according to the present invention. The block decoder 200 comprises a base vector provider 210 adapted to provide, in this embodiment, at least four base vectors based on the compressed block. The vector provider 210 could provide the base vectors by retrieving the relevant bit sequences from the compressed block. In an alternative embodiment, the provider 210 in addition expands the retrieved sequence as described in the foregoing. If four base vectors are provided, these do not span a right-angled parallelogram in feature vector space.

A pair selector 220 is arranged for selecting at least one pair of base vectors as neighboring base vectors based on a predefined ordering of the base vectors in the compressed block. In other words, the pair selector 220 is pre-programmed with a knowledge of which sequences of the compressed block that comprises representations of base vectors regarded as being neighboring vectors.

A vector determiner 230 determines at least one additional vector per neighboring pair selected by the pair selector 220. The additional vector is preferably calculated as a linear combination of the neighboring vectors of a pair using predefined or signaled vector weights.

A vector selector 240 then selects which vector among the base vectors from the base vector provider 210 and the additional vector(s) from the vector determiner 230 that is used as decoded representation of the original feature vector of an image element in the current block. This selection is performed based on a vector identifier included in the compressed block and associated with the image element.

The units 210 to 240 of the block decoder 200 may be provided as software, hardware or a combination thereof. The units 210 to 240 may be implemented together in the block decoder 200. Alternatively, a distributed implementation is also possible with some of the units provided elsewhere in the image decompressor.

Figure 18:
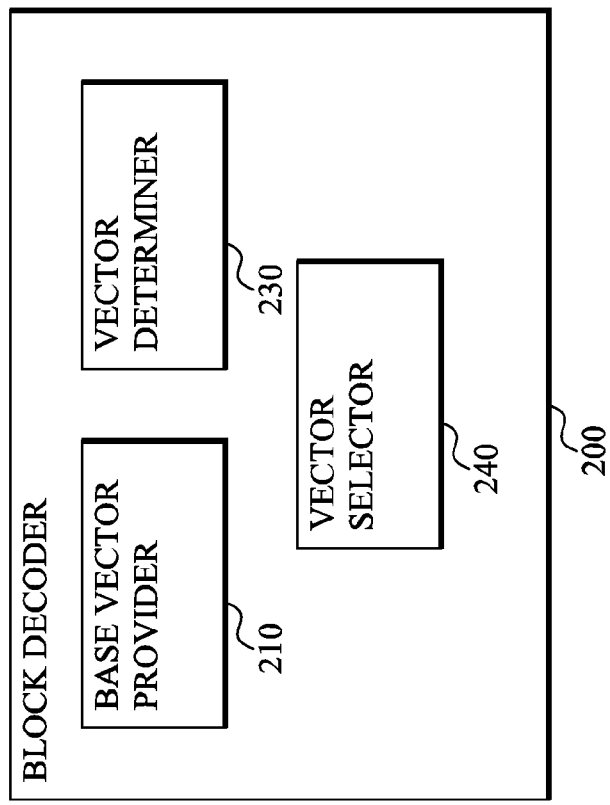
FIG. 18 is a block diagram of a block decoder according to an embodiment of the present invention.

FIG. 18 is an illustration of an alternative embodiment of a block decoder or decompressor 200 according to the present invention. This decoder 200 comprises a base vector provider 210 which is operated similar to the base vector provider of FIG. 17 with the addition that only three base vectors are provided based on the compressed block.

A vector determiner 230 is arranged for determining at least one additional vector for each pair of the three base vectors. The at least one vector is determined based on the base vectors in the pair, typically as one or more linear combinations thereof.

Finally a vector selector 240 selects a vector among the provided base vectors and the determined additional vectors to use a decoded representation of a feature vector for an image element based on a vector identifier associated with the image element and included in the compressed block.

The units 210 to 240 of the block decoder 200 may be provided as software, hardware or a combination thereof. The units 210 to 240 may be implemented together in the block decoder 200. Alternatively, a distributed implementation is also possible with some of the units provided elsewhere in the image decompressor.

In the foregoing, the present invention has been described with reference of processing image blocks having normals, preferably normalized surface normals, as feature vectors. In an alternative implementation, the feature vectors could be a color vector in a color space, such as RGB (red, green, blue) space. Also other image element features that are representable as feature vectors in a feature vector space can be processed according to the present invention.

It will be understood by a person skilled in the art that various modifications and changes may be made to the present invention without departure from the scope thereof, which is defined by the appended claims.

REFERENCES

[1] http://www.ati.com/products/radeonx800/3DcWhitePaper.pdf ATI™ Radeon™ X800 3Dc™ White Paper
[2] U.S. Pat. No. 5,956,431

The invention claimed is:

1. A method of compressing a block of image elements, each image element having an associated feature vector, said method comprising the steps of:
  determining, based on at least a portion of said feature vectors, at least four base vectors with the proviso that if four base vectors are determined, said four base vectors are not positioned in the corners of a right-angled parallelogram in a vector space;
  defining an order of said at least four base vectors;
  selecting at least one pair of base vectors of said at least four base vectors as neighboring base vectors according to said defined order;
  determining, for a selected pair of base vectors, at least one additional vector based on said pair of base vectors;
  selecting, for at least one image element and based on a feature vector associated with said image element, a vector among said at least four base vectors and said at least one additional vector as a representation of said feature vector; and
  assigning, to said at least one image element, a vector identifier associated with said selected vector.

2. The method according to claim 1, wherein said defining step is performed based on at least a portion of said feature vectors.

3. The method according to claim 1, wherein said step of determining at least one additional vector comprises determining, for each pair of neighboring base vectors according to said defined order, at least one additional vector based on said base vectors of said pair.

4. The method according to claim 1, wherein said step of determining at least one additional vector comprises determining said at least one additional vector as at least one vector pointing to a point on a line connecting the end points of said selected pair of base vectors.

5. The method according to claim 1, wherein said step of determining said at least four base vectors comprising determining each of said at least four base vectors as a respective representation of a feature vector of said block.

6. The method according to claim 5, wherein said step of determining said at least four base vectors and said defining step collectively comprise the steps of:
  a) selecting a set of at least four feature vectors of said block as candidate base vectors;
  b) selecting a candidate order for said candidate base vectors;
  c) determining at least one candidate additional vector based on a pair of candidate base vectors of said at least four candidate base vectors, said candidate base vectors of said pair being selected as neighboring candidate base vectors according to said candidate order;
  d) calculating, for each feature vector of said block, a minimum difference vector between said feature vector and a vector selected from said at least four candidate base vectors and said at least one candidate additional vector;
  e) calculating a sum of the lengths of said minimum difference vectors;
  f) repeating said steps b) to e) for each available candidate order;
  g) repeating said steps a) to f) for each available set of at least four feature vectors;
  i) selecting said at least four base vectors as said candidate base vectors associated with a smallest sum; and
  j) selecting said defined order as said candidate order associated with said smallest sum.

7. A method of decoding a feature vector representing an image feature of an image element from a compressed block, said method comprising the steps of:
  providing at least four base vectors based on said compressed block with the proviso that if four base vectors are provided, said four base vectors are not positioned in the corners of a right-angled parallelogram in a vector space;
  selecting at least one pair of base vector of said at least four base vectors as neighboring base vectors based on an order of said at least four base vectors in said compressed block;
  determining, for a selected pair of base vectors, at least one additional vector based on said pair of base vectors; and
  selecting, based on a vector identifier associated with said image element and included in said compressed block, a vector among said at least four base vectors and said at least one additional vector as a decoded representation of said feature vector.

8. The method according to claim 7, wherein said determining step comprises determining, for each pair of neighboring base vectors according to said order, at least one additional vector based on said base vectors of said pair.

9. The method according to claim 7, wherein said determining step comprises determining said at least one additional vector as at least one vector pointing to a point on a line connecting the end points of said pair of base vectors.

10. A compressor for compressing a block of image elements, each image element having an associated feature vector, said compressor comprising:
  a base vector determiner adapted to determine, based on at least a portion of said feature vectors, at least four base vectors with the proviso that if four base vectors are determined, said four base vectors are not positioned in the corners of a right-angled parallelogram in a vector space;
  an order definer adapted to define an order of said at least four base vectors;
  a pair selector adapted to select at least one pair of base vectors of said at least four base vectors as neighboring base vectors according to said defined order;
  an additional vector determiner adapted to determine, for a selected pair of base vectors, at least one additional vector based on said pair of base vectors;
  a vector selector adapted to select, for at least one image element and based on a feature vector associated with said image element, a vector among said at least four base vectors and said at least one additional vector as a representation of said feature vector; and
  an identifier assigner adapted to assign, to said at least one image element, a vector identifier associated with said vector selected by said vector selector.

11. The compressor according to claim 10, wherein said order definer is adapted to define said order based on at least a portion of said feature vectors.

12. The compressor according to claim 10, wherein said additional vector determiner is adapted to determine, for each pair of neighboring base vectors according to said defined order, at least one additional vector based on said base vectors of said pair.

13. The compressor according to claim 10, wherein said additional vector determiner is adapted to determine said at least one additional vector as at least one vector pointing to a point on a line connecting the end points of said pair of base vectors.

14. The compressor according to claim 10, wherein said base vector determiner is adapted to determine each of said at least four base vectors as a respective representation of a feature vector of said block.

15. The compressor according to claim 14, wherein said base vector determiner comprises:
- a feature vector selector adapted to select sets of at least four feature vectors of said block as candidate base vectors;
- a vector calculator adapted to calculate, for each feature vector of said block, for each available candidate order for said candidate base vectors selected by said order definer and for each set, a minimum difference vector between said feature vector and a vector selected from said at least four candidate base vectors and at least one candidate additional vector determined by said additional vector determiner based on a pair of candidate base vectors of said at least four candidate base vectors, said candidate base vectors of said pair being neighboring vectors according to said candidate order;
- a sum calculator adapted to calculate, for each available candidate order and each set, a sum of the lengths of said minimum difference vectors; and a set selector adapted to select said at least four base vectors as said candidate base vectors associated with a smallest sum, wherein said order definer is adapted to select said defined order as said candidate order associated with said smallest sum.

16. A decoder for decoding a feature vector representing an image feature of an image element from a compressed block, said decoder comprising:
- a base vector provider adapted to provide at least four base vectors based on said compressed block with the proviso that if four base vectors are provided, said four base vectors are not positioned in the corners of a right-angled parallelogram in a vector space;
- a pair selector adapted to select at least one pair of base vectors of said at least four base vectors as neighboring base vectors based on an order of said at least four base vectors in said compressed block;
- a vector determiner adapted to determine, for a selected pair of base vectors, at least one additional vector based on said pair of base vectors; and
- a vector selector adapted to select, based on a vector identifier associated with said image element and included in said compressed block, a vector among said at least four base vectors and said at least one additional vector as a decoded representation of said feature vector.

17. The decoder according to claim 16, wherein said vector determiner is adapted to determine, for each pair of neighboring base vectors according to said order, at least one additional vector based on said base vectors of said pair.

18. The decoder according to claim 16, wherein said vector determiner is adapted to determine said at least one additional vector as at least one vector pointing to a point on a line connecting the end points of said pair of base vectors.

* * * * *